United States Patent [19]

Nord et al.

[11] 3,911,161

[45] Oct. 7, 1975

[54] ELECTROSTATIC SPRAY-COATING WITH HOT MELT COMPOSITIONS

[75] Inventors: Eric T. Nord, Oberlin; Don R. Scarbrough, Elyria, both of Ohio

[73] Assignee: Nordson Corporation, Amherst, Ohio

[22] Filed: Oct. 2, 1972

[21] Appl. No.: 291,818

[52] U.S. Cl. .................. 427/30; 239/3; 239/15; 118/626; 427/29; 427/195; 427/345; 427/375; 427/422
[51] Int. Cl.² .......................................... B05D 1/04
[58] Field of Search ......... 117/93.4 R, 93.41, 102 A, 117/105.1, 17, 19, 21; 118/626, 312; 239/3, 15

[56] References Cited
UNITED STATES PATENTS

| | | | |
|---|---|---|---|
| 2,155,932 | 4/1939 | Davis | 117/105.1 |
| 2,608,176 | 8/1952 | Jenkins et al. | 117/93.4 R |
| 3,010,009 | 11/1961 | Ducati | 117/93.4 R |
| 3,048,498 | 8/1962 | Juvinall et al. | 117/93.4 R |
| 3,085,749 | 4/1963 | Schweitzer et al. | 118/626 |
| 3,428,044 | 2/1969 | Whitehead et al. | 117/105.4 |
| 3,511,693 | 5/1970 | Davidson | 117/102 A |

FOREIGN PATENTS OR APPLICATIONS
253,131   7/1964   Australia................ 117/93.4 R

*Primary Examiner*—John H. Newsome
*Attorney, Agent, or Firm*—Wood, Herron & Evans

[57] ABSTRACT

A method and apparatus for electrostatic spray-coating articles with hot melt compositions, e.g., hot thermoplastic compositions. The method involves the steps of heating a thermoplastic composition to a liquid state, atomizing the liquid to form finely divided particles, conducting the atomization in the presence of an electrostatic field and cooling the particles in the field. Articles are coated with the thermoplastic compositions by electrostatically charging the atomized particles with respect to the articles thereby causing the charged particles to be electrostatically deposited on the articles. The atomized particles are deposited on the articles with complete surface coverage and can be coalesced or re-melted on the article surface to provide a finished film thereon. The electrostatic spraying and spray-coating techniques avoid environmental pollution and offer significant cost savings in surface-finishing useful articles.

11 Claims, 1 Drawing Figure

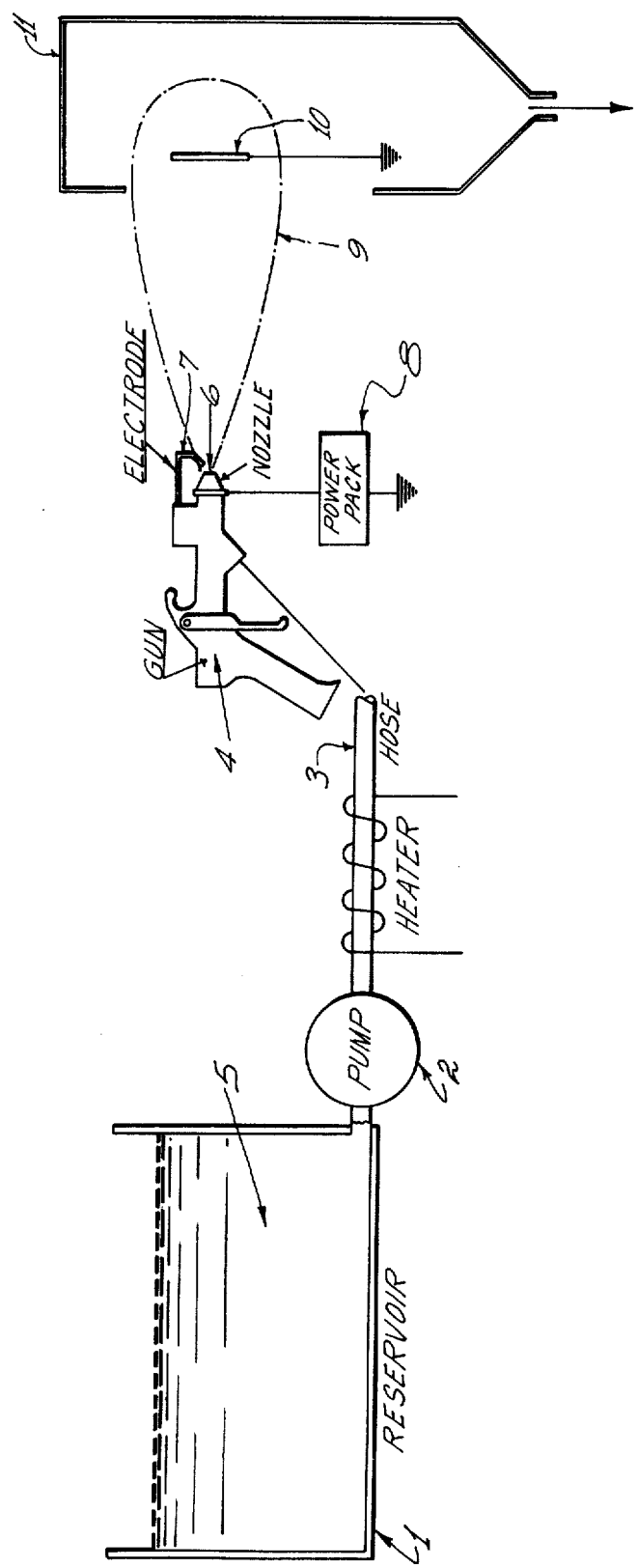

ELECTROSTATIC SPRAY-COATING WITH HOT MELT COMPOSITIONS

BACKGROUND OF THE INVENTION

The coatings and finishings industry has in recent years focused with greater intensity upon how and to what extent its operations are spoiling man's environment. One of the main reasons for such focused attention is that our advanced and integrated society and its more stringent environmental laws are requiring this industry along with all of industry to help in the maintenance of man's natural environment. Techniques for spray-coating materials tend to create odors, smog, health hazards, safety hazards, etc., and efforts have been devoted in the past in a search for solutions to these problems. Changes and improvements in spray techniques over the years have caused other and different problems.

Presently, there are a number of spray-coating techniques being employed in the industry. Such techniques generally involve the preparation or handling of raw materials and coating or finishing useful articles with such materials. The coating processes which have been mainly employed include liquid spray-coating, electrostatic liquid spray coating and electrostatic powder coating.

In the spray-coating application of a resinous or thermoplastic material, it is usual to dissolve the resinous material in an organic solvent to provide a suitable viscosity for spraying. An example of a solvent spray-coating technique is disclosed in U.S. Pat. No. 2,754,228. Sometimes the coating material is sprayed as a hot melt, i.e., a normally solid thermoplastic material is melted into a liquid form, conveyed to an atomizing device and atomized in a hot liquid state for coating a substrate. An example of a spray-coating apparatus and technique in which a thermoplastic material such as paraffin or wax can be melted and atomized is disclosed in U.S. Pat. No. 2,101,922. Such methods of spraying solvent mixtures of thermoplastics or hot melt film-forming materials require the maintenance of the atomized particles in a fluid or tacky state until reaching the object to be coated for adherence thereon and to provide a desirable surface coating. If particle solidification occurs in flight from the spray nozzle, before reaching the target surface, particles tend to rebound off the surface thereby reducing transfer efficiency, or sometimes they even agglomerate. In any event, solidification of atomized particles before reaching the surface of the article results in an unsatisfactory surface coating with this presently known equipment.

Electrostatic liquid spray-coating techniques have been employed for coating normally liquid materials, i.e., "paints" or solvent coatings, which have been atomized by air, airless or centrifugal atomization techniques. In these methods, the atomized liquid droplets are charged electrostatically usually between the spray gun and the object to be coated and home-in on the object under the influence of electrostatic attraction. A number of electrostatic liquid spray-coating processes have been disclosed and exemplified in the patent literature. See for example U.S. Pat. Nos. 2,764,125; 2,764,712; 2,893,894 and 3,048,498.

Finally, powdered coating materials of a thermoplastic or thermosetting nature have been electrostatically spray-coated. Electrostatic spray-coating of powders is of more recent origin. In this coating technique, thermoplastic or thermosetting materials are ground to a fine powder and sieved to uniformity. The powder particles are then metered into an air stream to an applicator head, for example a spray gun, where they are charged electrically and propelled toward an object to be coated. The effect of the electrostatic charge is to adhere the particles to the object until they can be passed into an oven where they are fused or cured to provide a surface coating.

With respect to the above described coating techniques, it is a common practice to dissolve a film-forming or solid thermoplastic coating composition in an organic solvent to allow the composition to be handled, atomized and deposited upon the article to be finished. In fact, in known liquid spraying techniques, it is usually essential to use a solvent for the plastic coating composition in order to obtain a satisfactorily sprayed coating. During handling, atomization or deposition of solvent coating composition, solvents will escape and if not effectively trapped, the escaped solvents will become air contamination. Even after a solvent coating is spread or applied to the article, solvents leave or escape from the coating film by evaporation and these too can become contaminants of the surrounding atmosphere. Furthermore, since most solvents are organic, they contribute to the pollution problems by creating toxic and/or rather unpleasant odors and/or smog. Organic solvents are further released during baking operations and are carried from the baking oven in the form of exhaust pollution. In an attempt to overcome the pollution problems associated with the solvent spray-coating techniques, sophisticated recovery and afterburner systems are employed to trap or burn solvent effluents. The cost of installation and operation of such systems and incinerators to dispose of the waste solvent is a very sizeable expense.

Thus, the coating industry has more recently sought to avoid the pollution and economic loss of materials caused by the solvent spray techniques by employing an electrostatic powder coating method above mentioned. In the electrostatic powder coating technique, no solvents are present for escape into the atmosphere. However, the electrostatic dry powder coating technique involves the use of costly coating material. Since this method operates on the principle of transporting a finely divided powder, it is essential to process the coating material into such a finely divided form. For this purpose, bulk resin must be crushed to a fine, rather uniform particle size and mixed with pigments, fillers, hardeners, additives and the like by sophisticated and rather expensive crushing and mixing equipment. Such equipment includes ball mills, thin-disc or hammer mills, kibblers, extruders, kneaders, centrifugal mixers, other compounding equipment, filters, sieves, conveyors and the like, all of which are employed to process the thermoplastic material into a dry powder form for transportation to the atomizing equipment. Accurate control of particle shape and size distribution must be accomplished by such equipment in order to obtain satisfactory results. But still technical problems remain in the electrostatic powder coating technique because it is difficult to provide powders having uniform sizes and smooth shapes. Furthermore, powdered particles tend to have short shelf-lives, agglomerate in handling and spraying, etc., all of which diminish the solventless appeal of the powder coating techniques. These technical problems and the high costs of equipment have precluded complete acceptance of the powder coating techniques.

In substance, there is a need for an efficient, economical process which is devoid of the problems associated with known techniques for spray-coating with thermoplastic materials.

SUMMARY OF THE INVENTION

This invention is directed to a method and apparatus for spray-coating articles with hot melt compositions. The invention eliminates many of the disadvantages associated with the prior art coating methods discussed above from pollution, equipment and cost standpoints. In one of its aspects, this invention is directed to spray-coating a useful article or substrate with a film-forming substance. For this purpose, for example, a thermoplastic polymer or similar heat-liquifiable material is heated to form a hot melt composition. This hot melt composition is atomized in the presence of an electrostatic field that is established between a source for the atomized particles (e.g., a spray gun) and the target article to be coated. The atomized liquid particles are charged electrostatically with respect to the target article and are propelled through an atmosphere, usually air, toward the article for electrostatic deposition on the article. It has been found that the atomized liquid droplets that are cooled or solidify in route to the target, caused by loss of heat upon atomization and travel, are electrostatically deposited on the target. In contrast, the prior art hot melt or solvent spray-coating techniques heretofore discussed require the atomized droplets to remain in a fluid or tacky state as they are propelled toward the target because coating depends, in such techniques, on the adherence of the fluid droplets to the target. In further contrast to this invention, the powder coating techniques discussed above require the solid thermoplastic to be pulverized prior to its insertion in the electrostatic spray systems because such systems operate on the principle of transporting a finely divided powder to a spray gun or spray head while entrained in an air or gaseous stream. In addition to the different principles of operation according to this invention, the major disadvantages of solvent pollution, material loss and cost that are associated with the prior art techniques of liquid or powder spraying, as detailed above, are overcome by this invention.

The method of this invention can be employed to overcome or eliminate for practical purposes the phenomenon of coalescence of atomized particles during atomization of the hot melt compositions that may occur when attempts are made to spray-coat such materials. Coalescence or the uniting of melt particles during atomization and in flight to the target reduces spraying efficiency or results in an unsatisfactorily coated article. Our method reduces this coalescence tendency by imparting like electrostatic charges to the atomized particles that inhibits their union.

In another of this invention's aspects, in certain applications where the hot melt is of low viscosity, atomization can be conducted by application of electrostatic forces without significant contribution by mechanical means. For this purpose, a hot melt film or stream can be caused to flow or be drawn over a surface or through a slot under the influence of an electrostatic field and atomization is then conducted by application of the electrostatic forces which break up or shear that film into atomized particles. Alternatively, the electrostatic forces can be supplemented by mechanical forces, for example, by causing a disc or other member to rotate such that the hot film or melt is centrifugally propelled and atomized under the influence of electrostatic forces. Under these circumstances, instead of employing an air or airless atomizing nozzle means, the rotating member or centrifugal force acts as an atomizing means.

Therefore, this invention is predicated in part upon the discovery that a hot melt or thermoplastic material can be heated to a liquid state, atomized and introduced into an electrostatic field established between an atomized particle source and the target wherein the liquid atomized particles cool and solidify in the electrostatic field as they are propelled and carried onto the target to be adhered by electrostatic forces. The atomized solid or powder particles which are oversprayed can be recovered and recycled for their use again in the method of this invention because of the thermoplastic or heat-liquifiable nature of the powder. The oversprayed finely divided solid particles have spherical or rounded shapes, in contrast to irregularly shaped crushed or ground particles. These spherical or rounded particles make them especially suitable for handling, recovery and recycle according to our technique.

Thus, in addition to our unique concept of thermoplastic melt solidification in an electrostatic field and reliance upon the electrostatic forces to secure the solidified particles to the target substrate, the electrostatic field can be employed to aid in atomization of the hot liquid thermoplastic particles, narrow the distribution of the atomized particles in transmit to the target and provide a homing force by which the particles seek out the grounded target. Complete article surface coverage or "wrap" with the atomized particles can be achieved with our technique. Also, we have found in contrast to hot melt spray techniques used without electrostatic fields, the transfer efficiency of coating material according to this invention is far superior, even up to 2–3 times or more. Our method offers significant economies in comparison to the electrostatic spraying of powders according to the techniques mentioned in the background of this invention. Furthermore, in comparison to the known solvent spray-coating techniques, this invention provides a method and means for solventless spraying of thermoplastic or melt materials. It eliminates the atmospheric contamination associated with such prior art solvent spray-coating techniques without the expensive recovery or after-burning equipment to get rid of the pollution caused by such prior techniques.

In a preferred form of the invention, a thermoplastic material is melted in a reservoir, conveyed or pumped via a heated and/or insulated conduit in a heated liquid state to an atomizing device, such as a spray gun, and atomized into fine droplets with or without the aid of an atomizing agent such as hot air or the use of a localized heated environment at the spray gun nozzle zone. However, as mentioned, in certain application areas where the hot melt is of low viscosity the atomization can be conducted by implication of electrostatic forces without significant contribution by mechanical means. Furthermore, rotating or centrifugal means can be used to aid in the atomization. The electrostatic field may be established by an independent electrode maintained at a high potential and located in or adjacent the zone of atomization to charge the atomized liquid particles; and the target article being coated functions as the other electrode or ground. According to this invention, apparatus is provided as a compact unit including a reservoir for liquifying the thermoplastic material, a pump for feeding the hot melt under pressure, a conveying line and an electrostatic spray gun either hand-held or fixed to a stationery or moving mount for spray-coating.

DESCRIPTION OF THE INVENTION

The invention and its operating parameters will be further understood in view of the following detailed description in which the spray-coating method of this invention is exemplified with reference to the drawing which is a diagrammatic illustration of a system incorporating the invention.

The invention will be first described in detail with relation to one preferred form of an airless spray nozzle embodied in a gun for spraying hot melt material. The invention will also be discussed with relation to a modified form of an atomizing apparatus and method for carrying out the present invention as shown in the co-pending application of Peter W. Runstadler, Jr., Eric T. Nord, Donald R. Hastings, Samuel Rosen, Don R. Scarbrough and Frederick R. Wilhelm for "Method and Apparatus for Producing a Flat Fan Paint Spray Pattern" filed July 30, 1971, Ser. No. 167,695, now U.S. Pat. No. 3,734,406.

In addition to these forms of atomizing apparatus, airless, air, centrifugal, etc., types are known as referred to in the patents mentioned in the background of this invention for sufficiently atomizing hot melt thermoplastic compositions according to this invention. Also, while the spray gun is shown as being provided with one form of charging means, the discussed atomizing means can be used advantageously in connection with other electrostatic spray guns having any suitable means for applying a charge to the hot melt spray. Suitable forms of electrostatic charging devices are shown in Juvinall et al. U.S. Pat. No. 3,169,882 and other patents mentioned above. Thus, it is to be expressly understood that the details of the gun shown in the drawings are shown by way of illustration and not by limitation.

The electrostatic spray system of the drawing is operable to supply a hot, liquid thermoplastic from a melt reservoir 1 via pump 2 and hose 3 to and through an electrostatic dispensing gun 4. In the embodiment illustrated, the hot liquid thermoplastic material 5 emerges from a gun orifice 6 where it picks up an electrostatic charge from a corona discharge field of an antenna 7 associated with the gun orifice 6. The electrical power is supplied by power pack 8. The liquid atomized particles 9 thus charged are then propelled from the gun 4 to an article or panel 10 having an opposite charge. Generally, the charge applied to the liquid atomized particles 9 is a negative one and the panel 10 is grounded. As a result of these opposite charges, the atomized particles 9 are attracted, transported over a narrow pattern and homed-in on the target panel 10 for adherence on its surface, both front and back. The melt particles cool and solidify in transit and carry onto the target to be adhered by the electrostatic forces between the charged particles and the panel 10. The overspray powder can be collected in booth 11 for collection and recovery for re-melting and reuse.

A suitable powder recovery system can take many forms such as that exemplified for purposes of illustration in U.S. application Ser. No. 259,591 filed June 5, 1972, in the name of Duncan et al. now U.S. Pat. No. 3,870,375.

EXAMPLE I

For the purpose of demonstrating the advantages of the invention, a polyamide thermoplastic resin, marketed under the trademark EMEREZ 1537 by Emery Industries, was employed in the system of the drawing. The softening point of the polyamide resin was about 115°C and it had a viscosity of 4–5 poise at 160°C. The thermoplastic polyamide resin was supplied in solid pellets having irregular shapes in the neighborhood of about ⅛ to ⅜ inch top size. The resin pellets were melted by placing them in the reservoir 1 of the hot melt unit and heating them to a temperature of about 430°F. The hose 3 temperature was maintained at approximately 410°F. The melt-gun system pressure was approximately 875 p.s.i.g. and the hot liquid thermoplastic resin was airless sprayed by pumping from the reservoir 1 through the gun orifice 6 where it was atomized into the surrounding atmospheric pressure and ambient temperature of about 74°F. A 90 kv. voltage was supplied from power pack 8 to the gun antenna 7 and the flow rate of the hot thermoplastic through the orifice of 0.0016 square inch cross-sectional area was about 4.4 grams per second. The atomized particles 9 became solid in air and were directed towards target panel 10 for deposition thereon. A metal target panel 10 of 4 × 8 inches was positioned at about 12 inches from the gun orifice 6. At the operating conditions, the sprayed thermoplastic became a powder within the 12 inch distance from the gun orifice 6. In five tests, about 42–52% of total solids sprayed were deposited on the target plate. The "wrap" of the solid thermoplastic powder material on the charged target was extremely good, coating both the front and the entire back of the panel 10. Upon panel baking, smooth coated surfaces result. The oversprayed particles were finely powdered, spherically shaped and could be picked up and handled.

When the system was employed without an electrostatic charge, the powder would tend to build up on the front face of a similar test panel, but was easily shaken off when the panel was touched. Furthermore, in the absence of an electrostatic charge when attempting to hot melt spray the atomized thermoplastic liquid material onto similar test panels, about 23.9% of sprayed solids reached the target panel and without any "wrap" onto the back of the panel.

Therefore, the above procedures conclusively demonstrate that a normally solid thermoplastic polymer of a high molecular weight can be melted to a liquid state by the application of heat, atomized in the hot liquid form through an airless atomizing gun, electrostatically charged in the zone between the spray gun nozzle and the object to be coated, solidified in particulate form and adhered to the object to be coated at a high order of efficiency through the use of the electrostatic technique of this invention. Furthermore, those powder particles which did not adhere to the object to be coated were in a form such that they could readily be recovered and recycled to the melt reservoir for reuse in the system.

EXAMPLE II

A micro-crystalline wax having a melting point of about 150°F. was spray-coated in a manner somewhat similar to the preceding example employing the principles of this invention. The micro-crystalline wax was melted by placing it in the reservoir 1 of the hot melt unit and heating to a temperature of about 230°F. The hose temperature was maintained at about 220°F. The hydraulic pressure of the system was approximately 500 p.s.i.g. and the hot liquid thermoplastic wax was airless sprayed by pumping from the reservoir 1 through the gun orifice 6 where it was atomized into the surrounding atmospheric pressure and ambient temperature of about 74°F. A 93 kv. voltage was supplied to the gun antenna 7 and the flow rate of the hot thermoplastic material through the orifice of 0.0016 square inch cross-sectional area was about 5.1 grams per second. A target panel 10 of 4 × 8 inches was positioned at about 24 inches form the gun orifice 6. At these operating conditions, the sprayed thermoplastic wax became a powder within the 24 inch distance. An analysis of wax powder sprayed under similar conditions had a particle diameter on the order of about 10–100ω of rather uniform distribution. In an average of three tests, about 55.3% of total solids sprayed was deposited on the target panels. Furthermore, the wrap of solid thermoplastic powder around the charged targets was excellent, coating the entire back of the panel. Upon baking the panels at about 160°F. for about 4½ minutes a smooth, uniform coating resulted.

The tests in the preceding paragraph were also performed in the absence of an electrostatic field. The transfer efficiency obtained for three tests was approximately 17.5% of total solids sprayed and virtually no wrap of sprayed material occurred onto the back of the panel.

EXAMPLE III

The thermoplastic resin of Example I was sprayed in this example by an air injection method instead of the airless method described in the previous examples. For this purpose, the airless spray gun apparatus of the drawing was replaced by a spray gun apparatus that operates in accordance with the principles described in Runstadler et al application mentioned above, with reference to the Figures of that application. The reservoir 1 of the hot melt unit, the fluid hose 3 and the gun were maintained at about 450°F. The injection air temperature was held at about 550°F. and the air and hydraulic pressures were within the range of approximately 70–80 p.s.i.g. A 90 kv. voltage was supplied to the gun antenna as in Example I and the hot thermoplastic was sprayed through the orifice. Upon spraying, the atomized particles were coated onto a target panel 10 with excellent wrap. The panel is then baked to provide a finished coating.

It is to be understood that other melt or thermoplastic materials can be sprayed and spray-coated employing the hot liquid electrostatic techniques according to the principles of this invention and that the above examples merely illustrate its practice in a presently preferred mode. However, in view of the above description and examples it will become apparent that there are other and different conditions which may be employed to secure the advantages of this invention. For example, a variety of thermoplastic polymers can be employed and the degree to which such materials must be heated to render same of a sprayable viscosity for atomization by either conventional air or airless techniques, or the air injection technique just described, will depend upon the thermoplastic material and its sprayable viscosity, degradation temperature, etc. Thermoplastics are normally solids or semi-solid materials at use temperatures, but melt or liquify upon heating the solids to higher temperatures; and upon cooling solidify or return to a solid or semi-solid state. Other examples of thermoplastic polymers include such polymers as polyethylene, polypropylene, polyamides (Nylon), chlorinated polyethers, epoxy thermoplastic or thermosetting polymers, cellulose esters such as cellulose acetate butyrate, halogenated polyolefins including polyvinyl chloride, and the like, polyesters such as polyethylene terephthalate, acrylics, such as polymethylmethacrylate, polyethylmethacrylate, etc., copolymers of the various mentioned materials, and the like. In order to secure the advantages of this invention, it will be appreciated that the essential requirement of the coating formulations is that they be thermoplastic, i.e., melting under the action of heat to a liquid state amenable to atomization. The term "melt composition" is used herein interchangeably with the term thermoplastic as the latter term is used in its broadest sense. It is of course to be appreciated that compositions may be thermoplastic at use temperatures herein but may contain curable thermosetting components that can be activated at higher temperatures or longer heat histories, etc. As is well known in the formulation and manufacture of polymeric compositions, the mentioned polymers can be formulated with hardeners or curing agents, stabilizers, pigments, extenders, additives to control flow, wetting agents, plasticizers, coloring agents, etc. Such additives are well known in the art of formulating thermoplastic resins and indeed are often employed to prepare useful coating compositions. In view of the advantages secured by this invention, modifications of melt or thermoplastic compositions suitable for use will become apparent. Furthermore, the electrostatic field conditions may be varied as will become obvious to one of skill in this art in view of the above description of this invention. The voltage and spacing between the atomizer nozzle and the articles to be coated may, of course, vary from the values set forth in the specific examples just described. Likewise, it is to be understood that other atomizing means can be used without departing from the spirit of this invention. In general, the potential gradients maintained between the high potential electrode and the articles being spray-coated are in the area of about several thousand volts per inch between the atomizer and the article to be spray-coated, but different potential gradients can be used as desired. It is also possible to reverse the electrostatic field exemplified in the drawing and above examples by grounding the atomizer and electrically charging the articles being coated. Also, it is to be understood that the method and apparatus of this invention can equally apply to the coating of horizontal surfaces or surfaces otherwise oriented than depicted in the drawing and above description. As mentioned above, the atomizing device itself may take other forms than the airless and injected air atomizing devices exemplified and reference is made to other air, centrifugal, etc., known techniques for sufficiently atomizing the hot melt thermoplastic compositions according to this invention. Therefore, various means for effecting atomization can be utilized in the electrostatic spray-coating techniques of this invention.

This invention permits the atomized particles to be completely solidified in route to the target and still efficient coating can be controlled by the presence of the electrostatic field. In those instances where some percentage of the atomized particles cool to a solid state while others perhaps remain somewhat fluid or tacky, the process advantages are still achieved. In this latter instance, the charged solid particles are carried onto the target for electrostatic adherence with the somewhat tacky particles. Versatility is achieved with our process to allow in certain applications for spray coating of 100% solid particles where the advantages of electrostatic powder coating are sought, i.e., allow a powder coating to flow off a defective part for recoating later. Such versatility allows for variations in the particle solidity where spray-coating is achieved on heated article surfaces, and where it is desired for finishing purposes to control the solidity, flow or adherence characteristics of the particles on the heated surface.

Having described our invention and exemplified its present modes of practice, other modifications will become apparent to one of ordinary skill without departing from its spirit and scope.

What is claimed is:

1. A method of spray-coating an article which comprises, heating a melt composition to a temperature based upon its softening point to provide a heated liquid mass, providing an article to be coated, atomizing said heated liquid mass to form atomized particles, conducting said atomization in the presence of an electrostatic field, cooling said particles in the presence of said field, electostatically transferring said particles to and depositing them on said article, said transferring being over a distance such that based on said temperature, a substantial number of said atomized particles solidify to a non-tacky state in route to said article, and.

recovering an amount of oversprayed atomized solid particles and recycling said oversprayed solid particles for inclusion in the heated melt composition.

2. The method of claim 1 further comprising the steps of, providing a propelling source for said atomized particles, establishing said electrostatic field between said source and said article, and electrostatically charging the atomized particles with respect to the article, said particles cooling in route to said article for electrostatic deposition on said target.

3. The method of claim 2 wherein said electrostatic field is established by a high potential electrode associated with a spray gun nozzle.

4. The method of claim 2 wherein said deposited particles are heated on said target to provide a smooth surface coating.

5. The method of claim 2 wherein said atomization is conducted in the presence of a gaseous atomizing agent.

6. The method of claim 1 wherein said melt composition consists essentially of a thermoplastic polymer composition having substantially non-volatile solids.

7. A method of spray-coating an article which comprises, heating a melt composition to a temperature based upon its softening point to provide a heated liquid mass, atomizing said heated liquid mass by an atomizing means to form atomized particles, providing a propelling source for said atomized particles, electrostatically charging the atomized particles with respect to the article by means of a charging electrode located adjacent or within said means with said article acting as another electrode, propelling said charged particles toward said article, said article at a distance from said atomizing means such that based on said temperature a substantial number of said atomized particles solidify to a non-tacky state in route to said article for electrostatic deposition on said article, heating the deposited particles to form a film coating on said article, and recovering an amount of oversprayed atomized solid particles and recycling said oversprayed solid particles for inclusion in the heated melt composition.

8. The method of claim 7 wherein said melt composition consists essentially of a thermoplastic polymer composition having substantially non-volatile solids.

9. An apparatus for spray-coating an article with a composition which comprises, a reservoir for containing a hot melt composition at a temperature based upon its softening point to provide a liquid heated mass, an atomizing and propelling device for said hot melt composition, an electrostatic charging device for charging atomized particles with respect to said article whereby said particles are electrostatically deposited on said article, means for supporting the article to be coated at a distance from said device such that based on said temperature a substantial number of said atomized particles solidify to a non-tacky state in route to said article for electrostatic deposition on said article, means for collecting an amount of oversprayed atomized solid particles, and means for recycling the collected oversprayed solid particles to said reservoir.

10. The apparatus of claim 9 wherein said collection means is a collection chamber for atomized particles.

11. An apparatus for spray-coating an article with a composition which comprises, a heated reservoir for containing a hot melt composition at a temperature based upon its softening point to provide a liquid heated mass, a spray nozzle for atomization of said hot melt composition, means for conveying said hot melt composition from said reservoir to said nozzle, a high potential charging electrode associated with said spray nozzle for electrostatically charging the atomized hot melt composition with respect to said article for electrostatic deposition thereon, means for supporting the article to be coated at a distance from said device such that based on said temperature a substantial number of said atomized particles solidify to a non-tacky state in route to said article for electrostatic deposition on said article, means for supplying electrical current to said charging electrode, a collection chamber for collecting an amount of oversprayed atomized solid particles, and means for recycling the collected oversprayed solid particles to said nozzle.

* * * * *